No. 793,246. Patented June 27, 1905.

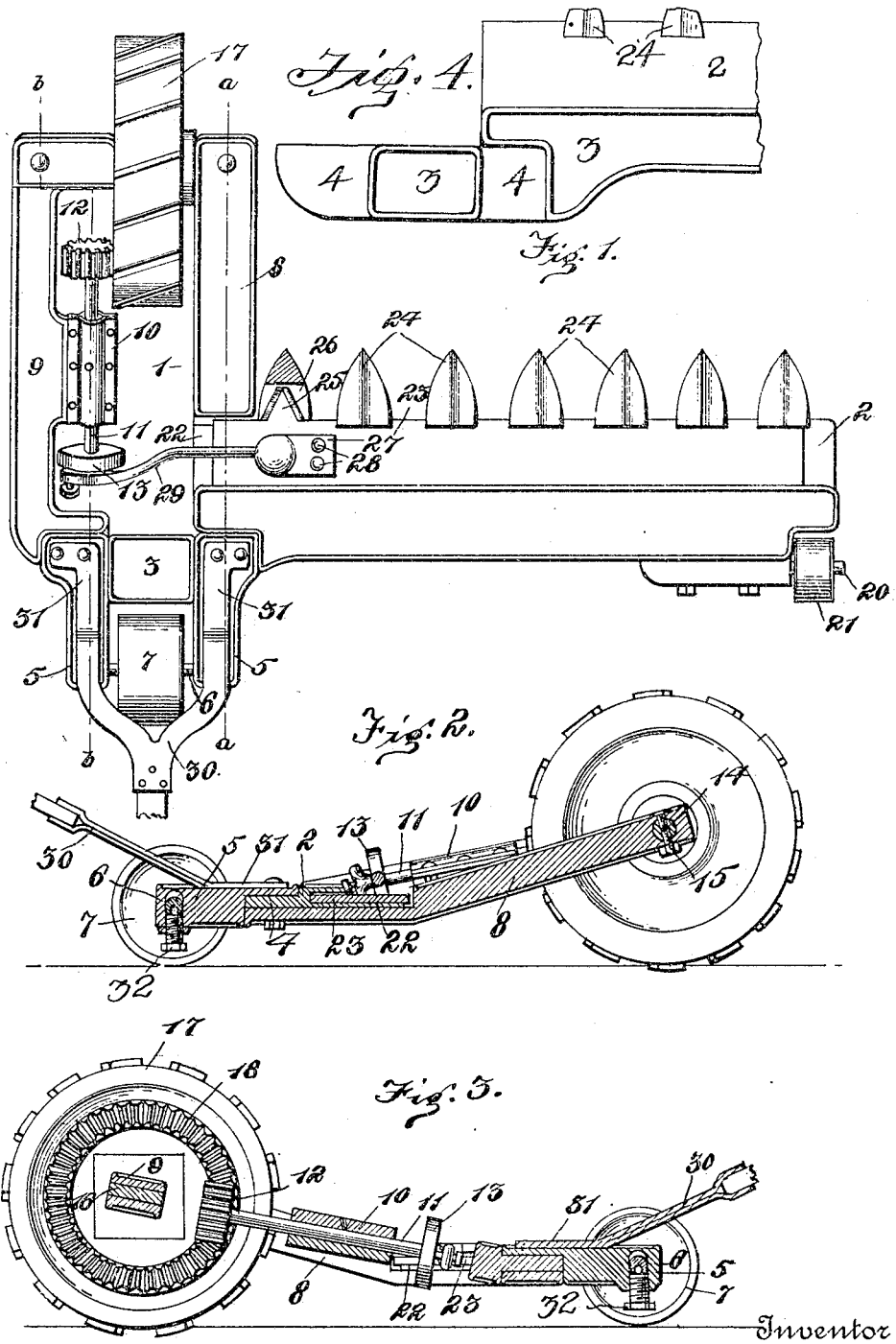

UNITED STATES PATENT OFFICE.

ROBERT L. TEAL, OF PADUCAH, KENTUCKY.

LAWN-MOWER.

SPECIFICATION forming part of Letters Patent No. 793,246, dated June 27, 1905.

Application filed March 2, 1905. Serial No. 248,120.

*To all whom it may concern:*

Be it known that I, ROBERT L. TEAL, a citizen of the United States, residing at Paducah, in the county of McCracken and State of Kentucky, have invented certain new and useful Improvements in Lawn-Mowers; and I do declare the following to be a full, clear, and exact description of the invention, such as will enable others skilled in the art to which it appertains to make and use the same.

My invention is an improved lawn-mower having a registering cutter-bar; and it consists in the construction, combination, and arrangement of devices hereinafter described and claimed.

In the accompanying drawings, Figure 1 is a top plan view of a lawn-mower embodying my improvements. Fig. 2 is a vertical sectional view of the same, taken on the plane indicated by the line $a$ $a$ of Fig. 1; and Fig. 3 is a similar view taken on the line indicated by the line $b$ $b$ of Fig. 1. Fig. 4 is a detail plan view of the finger-bar.

In the embodiment of my invention I provide a frame 1, from the inner side of which projects a finger-bar 2. The inner portion 3 of the finger-bar is widened and is provided on its upper side with recesses 4, in which a pair of rearwardly-extending bearing-arms 5 are gained. The said bearing-arms are appropriately spaced apart and carry an axle-bar 6, on which revolves a rear supporting-wheel 7.

The frame 1 comprises a pair of parallel longitudinal outer and inner bars 9 and 8, respectively, the rear ends of which are gained to the inner end portion of the finger-bar 2. On the inner side of the outer bar 8 is a bearing 10 for a longitudinal shaft 11, which is provided at its front end with a spur-pinion 12 and at its rear end with a crank-wheel 13. An axle 14 has its outer end secured to the outer end of the bar 8 by means of a bolt 15 and has its inner end inserted in a transverse opening 16, with which the inner bar 9 is provided. On this axle is mounted a front wheel 17, which is provided on one side with a crown-gear 18, which meshes with the pinion 12.

On the rear side of the finger-bar at its outer end is bolted an axle 20, which carries a supporting-wheel 21. The finger-bar is provided on its upper side with a longitudinal beam 22, in which the cutter-bar 23 operates. The finger-bar is provided on its front side with fingers 24, which are formed integrally therewith, and the cutter-plates 25 of the cutter-bar operate in recesses 26, with which the fingers are provided. A block 27, having a spherical socket, is secured to the inner portion of the cutter-bar by means of bolts 28. A pitman 29 has its outer end connected to a wrist-pin or crank-wheel and has a ball at its inner end which has its bearing in the socket of the block 27.

It will be understood that the rotation of the wheel 17 causes the gears 18 12 to rotate the crank-shaft and that the pitman which connects the crank-wheel to the cutter-bar causes the latter to reciprocate. By vertically adjusting the bearings 5 and the axle 20, which may be done by means of adjusting-screws 32, the finger-bar may be raised and lowered as may be required to cause the grass to be cut at any length desired.

The handle 30 has its lower end widened and bifurcated to form feet 31, which bear on the bearings 5 and are secured thereto by the bolts, which also serve to secure the said bearings to the finger-bar.

From the foregoing description, taken in connection with the accompanying drawings, the construction and operation of the invention will be readily understood without requiring a more extended explanation.

Having thus described my invention, what I claim as new, and desire to secure by Letters Patent, is—

A lawn-mower comprising a finger-bar, bearing-arms secured to the inner end of the finger-bar and extending rearwardly therefrom, a rear supporting-wheel carried by said bearing-arms, a frame at the inner end of the finger-bar comprising a pair of longitudinal outer and inner bars having their rear ends secured to the inner end of the finger-bar, a front supporting-wheel carried at the front end of the said bars and having a gear, a crank-shaft having a bearing in the outer longitudinal bar and provided with a pinion engaging said gear, a supporting-wheel at the outer end of the finger-bar, a cutter-bar carried by the finger-bar, and a pitman connecting the cutter-bar to the crank, substantially as described.

In testimony whereof I have hereunto set my hand in presence of two subscribing witnesses.

ROBERT L. TEAL.

Witnesses:
J. B. HALL,
A. M. BARNETT.